(12) United States Patent
Schneider

(10) Patent No.: US 8,345,861 B2
(45) Date of Patent: Jan. 1, 2013

(54) SHARING A SECRET USING POLYNOMIAL DIVISION OVER GF(Q)

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1167 days.

(21) Appl. No.: 12/197,082

(22) Filed: Aug. 22, 2008

(65) Prior Publication Data

US 2010/0046739 A1 Feb. 25, 2010

(51) Int. Cl.
*H04L 29/06* (2006.01)
(52) U.S. Cl. .......................................... 380/28; 380/283
(58) Field of Classification Search .................. 380/28, 380/283
See application file for complete search history.

(56) References Cited

U.S. PATENT DOCUMENTS

| | | | |
|---|---|---|---|
| 4,658,292 A * | 4/1987 | Okamoto et al. ............. | 380/239 |
| 6,182,214 B1 | 1/2001 | Hardjono | |
| 7,263,191 B2 * | 8/2007 | Chen et al. ................... | 380/265 |
| 7,313,701 B2 | 12/2007 | Frankel et al. | |
| 7,421,080 B2 | 9/2008 | Matsumura et al. | |
| 7,945,784 B1 | 5/2011 | Masinter et al. | |
| 2004/0071293 A1 * | 4/2004 | Yamamichi et al. .......... | 380/277 |
| 2005/0265550 A1 | 12/2005 | Tuyls et al. | |
| 2008/0016372 A1 * | 1/2008 | Staddon et al. ............... | 713/189 |

OTHER PUBLICATIONS

Schneier, Bruce, "Applied Cryptography, Second Edition—Protocols, Algorithms and Source Code in C", © 1996, John Wiley & Sons, Inc., title pages, pp. viii and 47-74.
Asmuth, Charles et al., "A Modular Approach to Key Safeguarding", *IEEE Transactions on Information Theory*, vol. IT-29, No. 2, Mar. 1983, pp. 208-210.
Blakley, G. R. et al., "Safeguarding Cryptographic Keys", *National Computer Conference, 1979, AFIPS—Conference Proceedings*, vol. 48, AFIPS Press, Montvale, NJ 07645, pp. 313-317.
Blakley, G. R. et al., "Security of Ramp Schemes", *Lecture Notes in Computer Science—Advances in Cryptology, Proceedings of CRYPTO 84*, Springer-Verlag, pp. 242-268.
Shamir, Adi et al., "How to Share a Secret", *Programming Techniques, Communications of the ACM*, Nov. 1979, vol. 22, No. 11, pp. 612-613.

(Continued)

*Primary Examiner* — Farid Homayounmehr
*Assistant Examiner* — Lisa Lewis
(74) *Attorney, Agent, or Firm* — Lowenstein Sandler PC

(57) ABSTRACT

A method and system for distributing a secret are described. In one embodiment, the secret is represented by a secret polynomial of degree d over GF(q) constructed with a prime or a power of a prime. The secret polynomial is then embedded into an extension polynomial of degree m that is greater than d. The extension polynomial is divided by n coprime divisor polynomials over GF(q), using arithmetic defined for polynomials over GF(q), to generate n shares of the secret. Each share includes one of the divisor polynomials and a corresponding remainder. These n shares are distributed among a plurality of cooperating entities for secret sharing.

20 Claims, 6 Drawing Sheets

SECRET SHARING

OTHER PUBLICATIONS

Red Hat Office Action for U.S. Appl. No. 12/197,089, mailed Aug. 24, 2011.

Red Hat Office Action for U.S. Appl. No. 12/197,089, mailed Mar. 13, 2012.

Cramer, R., et al., "Black-Box Secret Sharing from Primitive Sets in Algebraic Number Fields," Advances in Cryptology—CRYPTO 2005 Lecture Notes in Computer Science, 2005, vol. 3621/2005, 344-360, [retrieved from Springer Link database on Mar. 8, 2012].

Zhang, Yanshuo, et al., "Dynamic and Verifiable Secret Sharing Among Weighted Participants", Journal of Systems Science and Complexity; vol. 20, No. 4, pp. 481-485. [retrieved from SpringerLink on Aug. 15, 2011].

* cited by examiner

SHARING A SECRET USING POLYNOMIAL DIVISION OVER GF(Q)

TECHNICAL FIELD

Embodiments of the present invention relate to cryptographic techniques, and more specifically, to sharing a secret among cooperating parties.

CROSS-REFERENCE TO RELATED APPLICATIONS

The present application is related to co-filed patent application Ser. No. 12/197,089 entitled EMBEDDING A SECRET POLYNOMIAPL IN A LARGER POLYNOMIAL, which is assigned to the same assignee as the present application.

BACKGROUND

Secret sharing (or threshold secret sharing) is a cryptographic scheme that divides a secret into n pieces (or shares) such that any k of them (k<n) can be used to reconstruct the secret.

Adi Shamir discloses a technique that uses polynomial interpolations in the finite field GF(p) to construct a threshold secret sharing scheme (A. Shamir, "How to Share a Secret," Communications of the ACM, v. 24, n. 11, November 1979, pp. 612-613). George Blakley discloses a technique that uses hyperplane intersections in space to reconstruct a secret (G. R. Blakley, "Safeguarding Cryptographic Keys," Proceedings of the National Computer Conference, 1979, American Federation of Information Processing Societies, c. 48, 1979, pp. 313-317). However, in the polynomial interpolation scheme, inadvertently using an extra share produces an incorrect result. In the hyperplane intersection scheme, the number of required shares is obvious, and there is no way to use too many. Thus, it is generally not possible to distribute shares without also informing the recipients how many shares are required to reconstruct the secret.

Other secret sharing techniques based on the Chinese remainder theorem, such as the Asmuth-Bloom algorithm (C. Asmuth and J. Bloom, "A Modular Approach to Key Safeguarding," IEEE Transactions on Information Theory, v. IT-29, n. 2, March 1983, pp. 208-210), have also been proposed. However, these algorithms are defined only in the integer ring, which generally involve manipulation of integers of large sizes. Large integers are not suitable for computer operations. Thus, there is a need to develop a secret sharing technique that overcomes the above inherent limitations of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
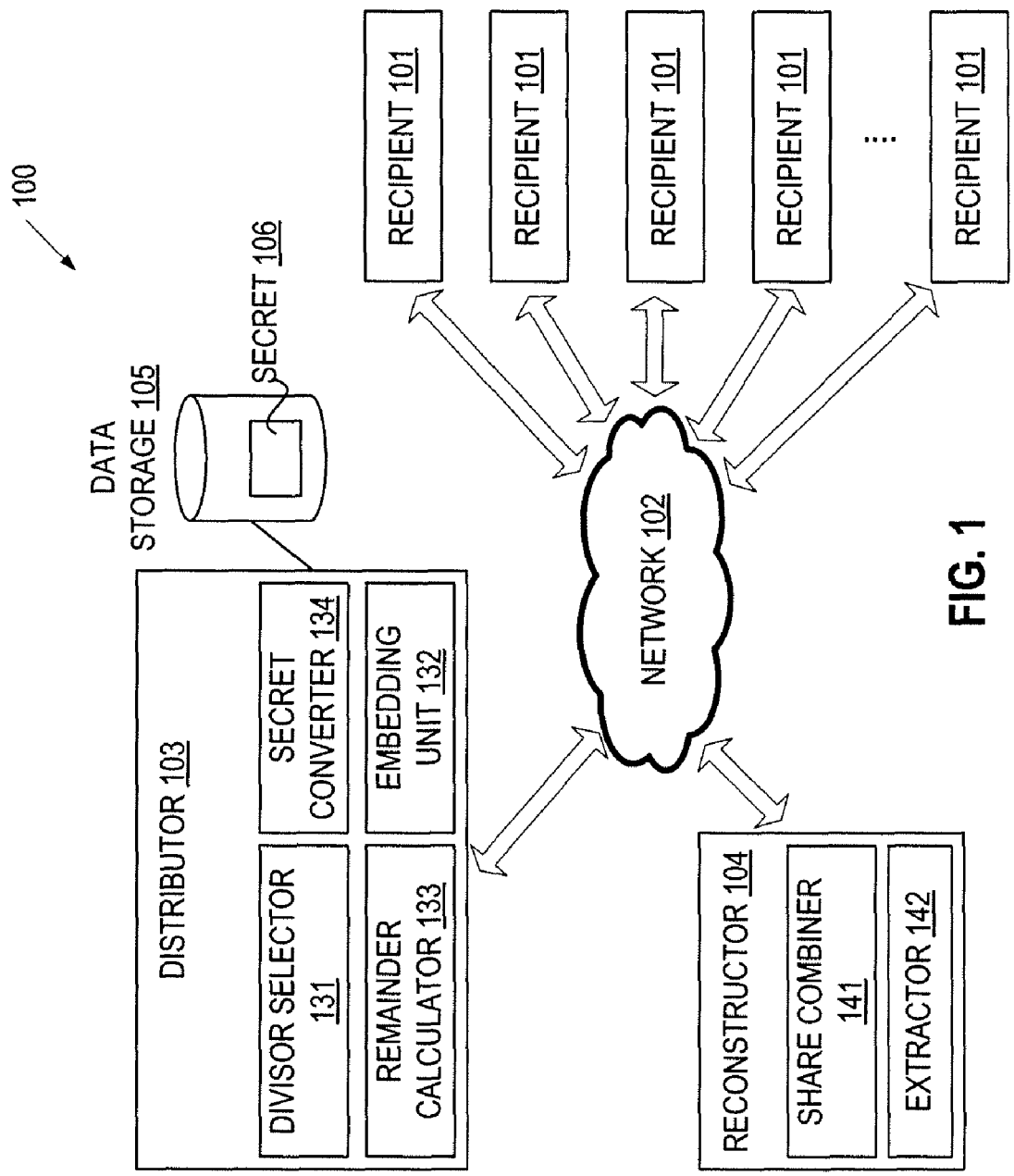
FIG. 1 illustrates a network architecture in which embodiments of the present invention may be implemented.

A method and system for distributing a secret are described. In one embodiment, the secret is represented as a secret polynomial of degree d over a finite field of small characteristic, such as $GF(q)$, where $q=p^n$, p is prime number and n is an integer greater than zero. The secret polynomial is then embedded into an extension polynomial of degree m that is greater than d. The extension polynomial is divided by n coprime divisor polynomials over $GF(q)$, using arithmetic defined for polynomials over $GF(q)$, to generate n shares of the secret. Each share includes one of the divisor polynomials and a corresponding remainder. These n shares are distributed among a plurality of cooperating entities (e.g., computing devices or storage devices) for secret sharing. If p is small enough (which depends on the word size of the computing device performing the calculations), all of the operations can be carried out on the computing device using single-precision arithmetic.

The secret sharing technique described herein allows the use of more than a threshold number (or a minimum number) of shares to reconstruct a secret. Thus, the shares can be distributed without informing the recipients how many shares are needed to reconstruct the secret. If more than enough shares (i.e., greater than the threshold number of shares) are used in reconstructing the secret, the result will still be the same.

An exemplary use of the secret sharing technique is a multi-factor key escrow system, where shares from a master key are given to a set of federated entities such that a threshold number of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "representing", "embedding", "generating", "dividing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. The secret 106 may be a number, a bit string or other representations that can be converted into a sequence of numbers that corresponds to a polynomial over $GF(p)$, where p (also referred to a base prime) is a prime number. In some embodiments, the secret 106 may be represented as a polynomial over $GF(q)$, where q is a prime power defined as $q=p^n$, p is prime number and n is an integer greater than zero. To simplify the descriptions below, q will be used to represent a prime number (where $n=1$) or a power of a prime number (where $n>1$). In one embodiment, the secret 106 is a cryptographic key to be jointly held in escrow by the recipients 101.

To safeguard the secret 106, the distributor 103 generates a plurality of shares of the secret 106 and distributes one or more shares to each of the recipients 101. The secret 106 can be reconstructed from a subset of the distributed shares. In one embodiment, the cryptosystem 100 also includes a reconstructor 104 to reconstruct the secret 106 using the distributed shares. A person of ordinary skill in the art would appreciate that the reconstructor 104 may be a separate computing system as shown in FIG. 1, or, alternatively, reside in the same computing system as the distributor 103 or any of the recipients 101. The distributor 103, the recipients 101 and/or the reconstructor 104 may be, for example, servers, personal computers (PCs), mobile phones, palm-sized computing devices, personal digital assistants (PDAs), or the like.

In one embodiment, the distributor 103 includes a secret converter 134, a divisor selector 131, an embedding unit 132, and a remainder calculator 133 to generate the shares. The reconstructor 104 includes a share combiner 141 and an extractor 142 to reconstruct the secret 106 from the distributed shares. The functions of these components will be described in greater detail below in connection with FIGS. 2-5.

In one embodiment, the distributor 103 distributes the shares of the secret to the recipients 101 using a transport-safe coding. An embodiment of the transport-safe coding transcodes (converts) the input to elements of a finite field $GF(q)$ (where q is a prime number or a power of a prime number), in which operations of a cryptographic algorithm (e.g., secret sharing) is performed. The result of the cryptographic algorithm, which contains elements of $GF(q)$, can be mapped directly to a transport-safe code for transporting via a communication protocol that is not safe for transporting binary values. For example, the input data stream can be transcoded into a polynomial over GF(67) if the subsequent cryptographic algorithm operates over GF($67^n$). After the cryptographic function is performed, the output (which is still a set of integers in the range 0-66) can be mapped into a transport character set of 67 characters. By contrast, if a standard transport coding (e.g., base-64) is used, additional conversions would be needed for transmission (as well as reception) of the data stream. With base-64 coding, the input would first have to be transcoded to a polynomial over GF(67) for the cryptographic operations. The result of the cryptographic operations would have to be converted back to a binary form, which is then transcoded to base 64 for transport.

In one embodiment where the output data stream consists of a sequence of elements from a set of q printable characters, the base q may be a prime number or a power of a prime less than 94, e.g., q may be any of the following numbers: 2, 3, 4, 5, 7, 8, 9, 11, 13, 16, 17, 19, 23, 25, 27, 29, 31, 32, 37, 41, 43, 47, 49, 53, 59, 61, 64, 67, 71, 73, 79, 81, 83, and 89. The number 94 comes from the fact that there are 94 printable characters (such as, for example, ASCII characters). With an appropriate choice of the base q, the index values generated in the transport-safe coding can be used as the coefficients of a polynomial that represents the secret over GF(q), and the shares (containing elements of GF(q)) generated from the secret can be directly used for transport. Thus, when the secret sharing is used in tandem with the transport-safe coding, the prime number or prime power q that constructs GF(q) for secret sharing is often chosen to be the same as the base q for the transport-safe coding.

In an alternative embodiment where binary coding is used for transporting the output data stream over a binary safe communication channel, the base q can be determined by the number of bits (g) in the binary code (e.g., q equals to the smallest prime number greater than $2^g$). For example, a convenient size for the binary code is 8 bits, as modern computing systems generally use 8-bit bytes as the smallest unit of addressable storage. If the binary code uses 8-bit codes, the base q may be chosen as 257 (as 257 is the smallest prime number greater than $2^8$).

However, it is understand that the secret sharing described herein does not need to be combined with transport-safe coding or binary coding. In a scenario where the secret sharing technique is not used with transport-safe coding or binary coding, the secret can be represented as a polynomial over GF(q), where q can be any prime number greater than 2 and of a size that is reasonable for the size of the secret to be shared (e.g., 65,537).

Figure 2:
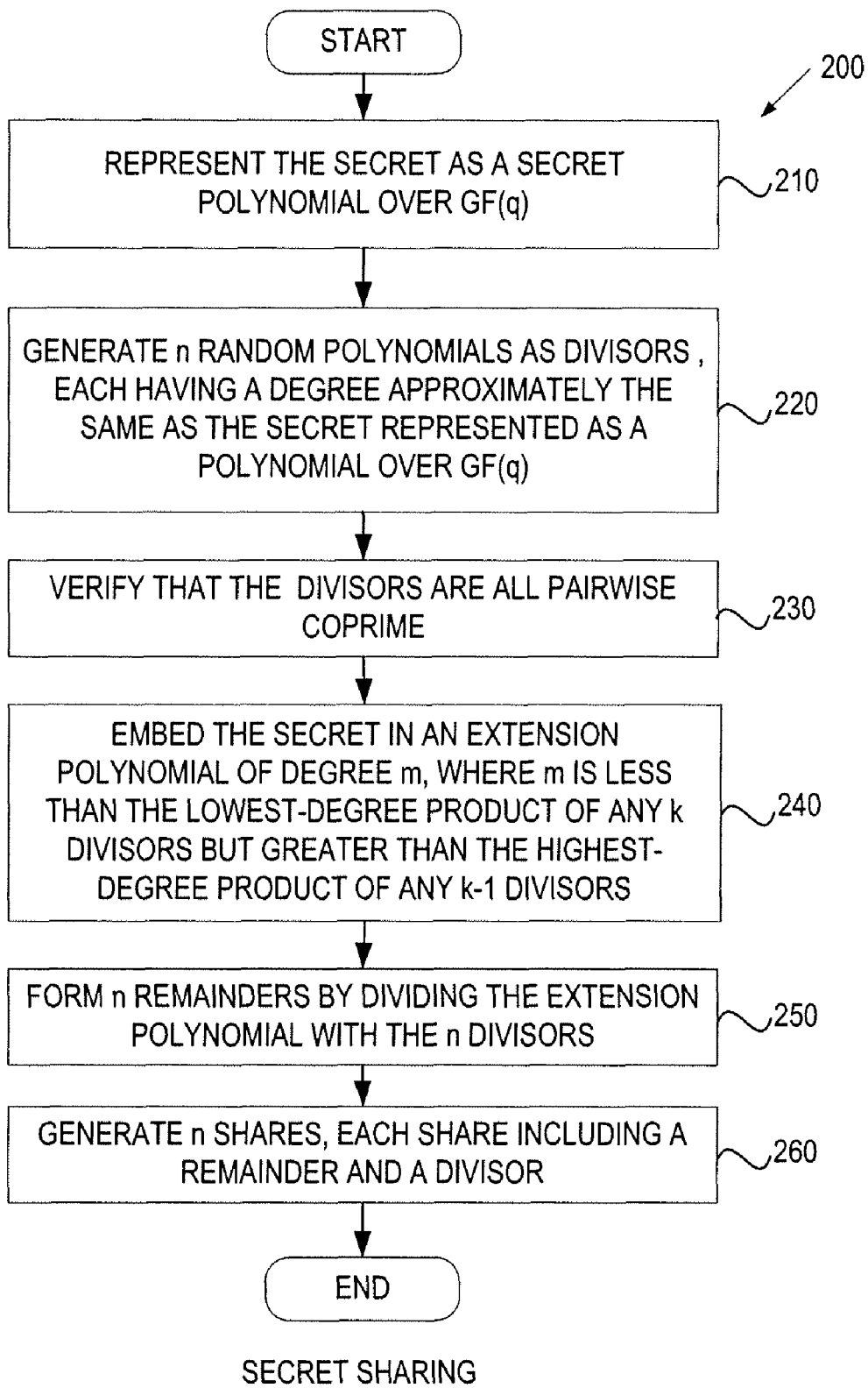
FIG. 2 is a flow diagram of a secret sharing method according to one embodiment of the present invention.

FIG. 2 illustrates a flow diagram of one embodiment of a method 200 for generating a plurality of shares from a secret S (e.g., the secret 106). In one embodiment, the total number (n) of shares, the threshold number (k) of shares for secret reconstruction, and the prime number or the prime power q for constructing GF(q) are determined by a user or an administrator of the distributor 103, based on the available computing or storage resources, the available number of recipients 101 that can jointly hold the shares of the secret, and whether transport-safe or binary coding is used for transporting the shares to the recipients 101. The threshold number (k) of shares for secret reconstruction is also related to the size of the secret, as represented as a polynomial over GF(q). The method 200 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the method 200 is performed by the distributor 103 of FIG. 1.

Referring to FIG. 2, at block 210, the method 200 begins with the secret converter 134 of the distributor 103 representing the secret as a secret polynomial=$c_0+c_1x+c_2x^2+\ldots+c_dx^d$ over GF(q). Each of the coefficients in the sequence ($c_0, c_1, \ldots c_d$) is an integer in the range of (0, q−1). The secret can be converted from its original format to the sequence of coefficients by a number of different techniques. For example, if the original secret is a decimal number, the sequence of coefficients ($c_0, c_1, \ldots, c_d$) can be generated by repeatedly dividing S by q and retaining the reminders. If the original secret is a sequence of binary bit string, the sequence of coefficients ($c_0, c_1, \ldots, c_d$) can be generated by converting consecutive subsequences of the secret bit string individually. Illustratively, if q is 67, each 6 bits of the secret bit string can be grouped together to produce a coefficient that is less than 67. If q is 89, each 32 bits of the secret bit string can be grouped together to produce 5 elements of the output at a time (e.g., by repeatedly dividing the 32-bit value by 89 and retaining the remainders). For prime numbers having a value between 67 and 89 (such as 73), it may be necessary to use longer sections of the secret bit string, or even the entire secret bit string. For example, with a 256-bit secret, the theoretical minimum required size of the secret polynomial over GF(73) is 41st degree (as $73^{42}>2^{256}>73^{41}$). This (the 41st degree) is one less than if the secret were interpreted in blocks of six bits each (as $64^{43}>2^{256}>64^{42}$). As another example, if binary coding is used with q=257, every 8 bits of the secret bit string can be coded in 8 bits and used as a coefficient for the secret polynomial. Also, reducing a 16-bit quantity modulo 257 can be accomplished by subtracting the high order 8 bits from the low order 8 bits, and adjusting any carries. The number 65536 would be reduced to one.

Continuing to block 220, the divisor selector 131 of the distributor 103 generates n random polynomials as n divisor polynomials (or divisors) over GF(q). Each of the n divisors is random in that the coefficients of the polynomials are randomly selected from the range of integers in (0, q−1). Each divisor has approximately the same size as the secret being shared. That is, the degree of each divisor is approximately the same as the degree of the secret polynomial (that is, when the secret is represented as a polynomial over GF(q)). For example, to share a 256 bit secret using 89 as the base prime q, each divisor polynomial may have degree of 39 or 40, as $89^{39}<2^{256}$ and $89^{40}>2^{256}$.

Continuing to block 230, the divisor selector 131 verifies that the n random polynomials are all pairwise coprime. A group of polynomials ($p_1, p_2, \ldots p_n$) are pairwise coprime if and only if any two polynomials in the group have no common factor other than 1 (the constant term of a polynomial). If any of the n random polynomials is not pairwise coprime with respect to any of the other random polynomials, the divisor selector 131 replaces that random polynomial with a new random polynomial until all of the n random polynomials are pairwise coprime. In alternative embodiments, the divisor selector 131 may verify the property of pairwise coprime each time a new random polynomial is generated at block 220. In this alternative embodiment, each time the divisor selector 131 generates a new polynomial, that new polynomial is compared with all the previously-generated random polynomials to determine whether they are pairwise coprime. If the new random polynomial is not coprime with respect to any of the previously-generated random polynomials, the divisor selector 131 replaces that new polynomial with another random polynomial that is pairwise coprime with all of the previously-generated random polynomials. The divisor selector 131 continues the operations of blocks 220 and 230 until all n random polynomials are pairwise coprime as n polynomials over GF(q). The resulting n random polynomials will be used as divisors in the generation of shares.

In yet another embodiment, the divisor selector 131 may construct random monic polynomials that are irreducible over GF(q), where q is a prime or a power of a prime. A monic polynomial is a polynomial in which the coefficient of the highest order term is one. The divisor selector 131 then multiplies the monic polynomials by a random non-zero element of GF(q). As long as the monic polynomials are distinct, they are guaranteed to be pairwise coprime over GF(q), as are their products with random non-zero elements of GF(q).

Continuing to block 240, the embedding unit 132 embeds the secret in an extension polynomial E of degree m over GF(q), where m is less than the lowest-degree product of any k divisors but greater than the highest-degree product of any k−1 divisors. For example, assume that an (n, k) secret sharing scheme is used, where the total number of shares is n=6 and the threshold number of shares for reconstructing the secret is k=4. If the divisors polynomials are all of degree 40, the secret will be embedded in an extension polynomial E of degree m, where m is greater than 120 (=3*40) but less than 160 (=4*40). An embodiment of the embedding unit 132 will be described in greater detail with reference to FIG. 3A.

The embedding unit 132 extends a secret polynomial of degree d (when represented as a polynomial over GF(q)) to an extension polynomial of degree m. Provided that each divisor is chosen to be of d degree, the degree m of the extension polynomial is between d*(k−1)+1 and d*k−1. The embedding unit 132 extends the length of the secret such that each divisor can have a "safe" length (e.g., at least as long as the original secret) to increase the difficulty of brute force attacks. The length of the divisors is directly related to the security of the secret. If the length of the divisors is not at least as long as the original secret, it will reduce the brute force attack solution space from the original length of the secret to however many bits that are lacking from having a complete set of k divisors.

In an example of q=89, a 256-bit secret can be expressed as a 39th degree polynomial (40 terms) over GF(89). In an (8, 5) scheme, without extending the secret, each share divisor would be 8th or 9th degree. Assuming 9th degree divisor polynomials, an attacker in possession of 4 shares could construct a series of guesses about the secret by finding a 9th degree polynomial over GF(q) that is pairwise coprime with the divisor polynomials of the 4 shares, and then generating a sequence of guesses about the corresponding 8th degree remainder polynomial. For any particular divisor polynomial, there are only $89^9$ different possible remainder polynomials. This is less than $2^{58.3}$, providing roughly the same security as a hypothetical cipher that used a 58 or 59 bit key. Thus, if the length of the secret is not extended such that each divisor has a "safe" size (e.g., at least as long as the original secret), attackers with fewer than k shares could construct a set of guesses for the secret that will allow them to find the secret faster than an exhaustive search.

Continuing to block 250, the remainder calculator 133 calculates n remainders by dividing the extension polynomial E with each of the divisors. The calculation is performed using arithmetic defined for polynomials over GF(q). At block 260, the distributor 103 forms n shares of the secret, each share including one of the n divisors and a corresponding remainder. The method 200 then terminates.

It is understood that the operations of the method 200 can follow a different sequence from what is shown in FIG. 2. For example, the calculation of the extension polynomial E may be performed before the calculation of the divisors.

The computation performed by the above-described secret sharing technique uses modular arithmetic with polynomials over small primes. That is, the polynomial operations are performed on numbers in the range of (0, q−1) to generate a result less than q. It is not necessary to keep track of the carries during the computation, as the addition of two corresponding polynomial terms (the same degree terms) generates no carry to a term of a higher degree (that is, the addition of the constant terms does not carry over to the $1^{st}$ degree term, the addition of the $1^{st}$ degree terms does not carry over to the $2^{nd}$ degree terms, etc.) As a result, the computation can be efficiently run on constrained hardware (e.g., an embedded microcontroller), where at least some of the computation is handled by software. Software can be programmed to efficiently handle the computation of the polynomials over GF(q), which involves single precision integer arithmetic over integers of a small size (limited by the size of q). If the embedded system is provided with sufficient memory (e.g., read-only memory) and the size of the base prime q is small, polynomial multiplications can be implemented with table lookups. For example, if q is 37, the lookup table size would be 37 by 37 (=1369). The polynomial operations over GF(q) can also be efficiently implemented in array processors for parallel processing. For example, multiplication of two polynomials over GF(q) can be implemented by processing elements of an array processor, each holding one coefficient of a first polynomial. Each time a processing element receives a coefficient of a second polynomial, it performs a multiply-and-add operation over small integers. A person of ordinary skill in the art would appreciate that other embodiments may exist for processing polynomial operations over GF(q).

To reconstruct the secret from the n distributed shares, the share combiner 141 of the reconstructor 104 first combines the k or more shares it collects from the recipients 101 to reconstruct the extension polynomial E. The share combiner 141 applies the extended Euclidean algorithm to reconstruct the extension polynomial E, using arithmetic defined for polynomials over GF(q). According to the Chinese remainder theorem, there exist solutions that are congruent modulo the product of the k or more divisors used to reconstruct the extension polynomial. The extended Euclidean algorithm is well-known in the art. Thus, the operation of the share combiner 141 is not described.

After the extension polynomial E is reconstructed, the extractor 142 extracts the secret from the extension polynomial E to obtain the secret. An embodiment of the extractor 142 will be described in greater detail with reference to FIG. 3B.

Having described the technique for share generation and reconstruction using an extension polynomial, the following descriptions explain, in detail, embodiments of techniques for extending a secret into an extension polynomial and for extracting the secret from the extension polynomial.

Figure 3A:
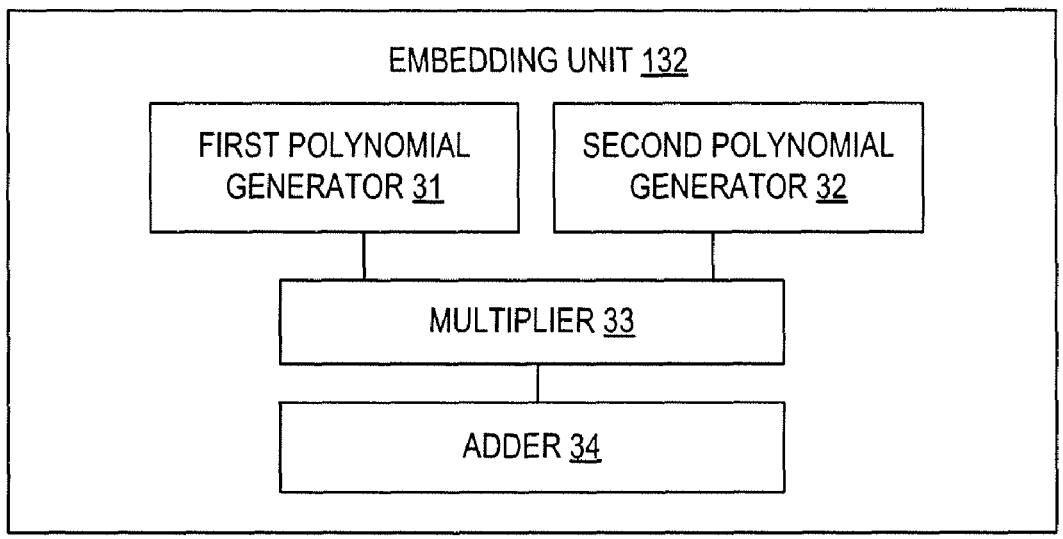
FIG. 3A illustrates a block diagram of one embodiment of an embedding unit that extends the length of a secret to produce an extension polynomial.

FIG. 3A illustrates an exemplary system of the embedding unit 132 (referred to in FIG. 1) in which embodiments of the present invention may operate. In the embodiment of FIG. 3A, the embedding unit 132 includes a first polynomial generator 31, a second polynomial generator 32, a multiplier 33 and an adder 34. It is understood that the embodiment of FIG. 3A is for illustration purposes only; variations of the embodiment may exist.

Referring to FIG. 3A, the first polynomial generator 31 generates a random polynomial I over GF(q), where I is an irreducible polynomial with degree t that is greater than any represented secret would have. A polynomial is irreducible over GF(q) if it has no roots in GF(q). For example, if a plurality of 256-bit Advanced Encryption Standard (AES)

keys are to be shared as secrets represented as polynomials over GF(89), the polynomial I will be an irreducible polynomial of 40th or higher degree (as $89^{40} > 2^{256}$). The polynomial I is known to the reconstructor 104 during the reconstruction of the secret. The polynomial I does not need to be kept secret. In some scenarios, the polynomial I can be published to the public. For maximum security, the polynomial I is chosen to be dense (have few zero coefficients).

The second polynomial generator 32 generates a random polynomial R of degree (m−t) over GF(q), where m is the degree of the extension polynomial E. The polynomial R is coprime with both the secret polynomial S and the polynomial I, where each of R, S and I represents a polynomial over GF(q). As a result, the polynomials R, S and I are pairwise coprime with each other. The coefficients of the polynomial R come from a cryptographically strong source—either a truly random source in an ideal situation, or at least a cryptographically secure source that resists brute force attacks. The polynomial R is maintained as a secret without being shared with the recipients 101 or the reconstructor 104. In one embodiment, the polynomial R may be discarded after the secret is embedded.

The multiplier 33 multiplies R with I to produce a product (R*I), using polynomial multiplications over GF(q). The adder 34 adds the secret polynomial S to the product (R*I), using arithmetic defined on GF(q). That is, the adder 35 adds the coefficients of corresponding terms of the polynomials modulo q, without performing a carry across terms of different degrees. The output of the adder 34 is the extension polynomial E.

Figure 3B:
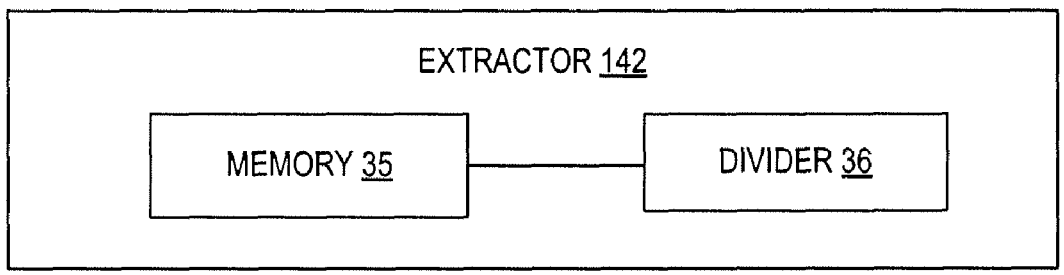
FIG. 3B illustrates a block diagram of one embodiment of an extractor that extracts the secret from the extension polynomial.

FIG. 3B illustrates an exemplary system of the extractor 142 (referred to in FIG. 1) in which embodiments of the present invention may operate. In the embodiment of FIG. 3B, the extractor 142 include a memory 35 to store a copy of the extension polynomial E and the irreducible polynomial I, and a divider 36 to calculate E divided by I (i.e., E/I) using arithmetic defined for polynomials over GF(q). The remainder of the division is the secret S, represented as a polynomial over GF(q).

Figure 4:
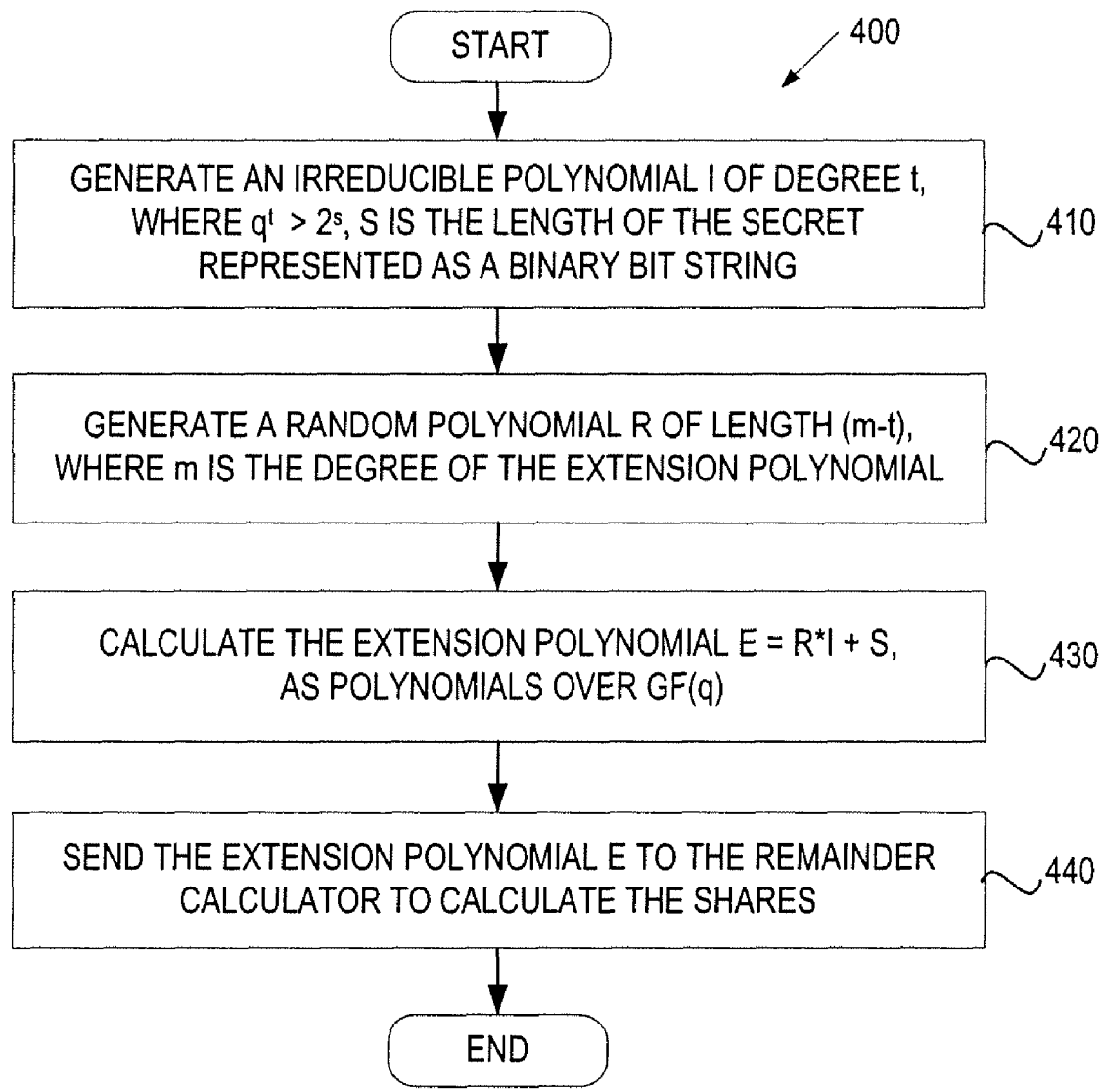
FIG. 4 illustrates a flow diagram of one embodiment of a method for producing the extension polynomial.

FIG. 4 illustrates a flow diagram of one embodiment of a method 400 for extending the secret into an extension polynomial of a higher degree. It is noted that the method 400 corresponds to the detailed operations of block 240 of FIG. 2. The method 400 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the method 400 is performed by the embedding unit 132 of FIG. 3A.

Referring to FIG. 4, at block 410, the embedding unit 132 generates a first random polynomial I that is an irreducible polynomial over GF(q). The degree t of the polynomial I is greater than any represented secret would have. At block 420, the embedding unit 132 generates a second random bit string R that is coprime with both the secret polynomial S over GF(q) and the random polynomial I. The bit string R has degree (m−t), where m (the degree of the extension polynomial) is less than the lowest-degree product of any k divisors but greater than the highest-degree product of any k−1 divisors used for share generation. At block 430, the embedding unit 132 multiplies R with I, as polynomials over GF(q), to obtain a product. The embedding unit 132 further adds the secret polynomial S to the product of R*I to obtain an extension polynomial E. As a result, the extension polynomial E is calculated as E=R*I+S as polynomials over GF(q). At block 440, the embedding unit 132 sends the extension polynomial E to the remainder calculator 133 of FIG. 1 to calculate the shares of the secret.

After the extension polynomial E is computed, the remainder calculator 133 calculates n remainders by dividing the extension polynomial E with the previously-computed n divisors. The distributor 103 then forms n shares of the secret, each share including a pair of (remainder, divisor), and distributes the shares to the n recipients 101. To compute the secret from the n shares, the share combiner 141 of FIG. 1 first combines the k or more shares it collects from the recipients 101 to reconstruct the extension polynomial E, using the extended Euclidean algorithm. The extractor 142 then extracts the secret from the extension polynomial E to obtain the secret by performing the operations described below with reference to FIG. 5.

Figure 5:
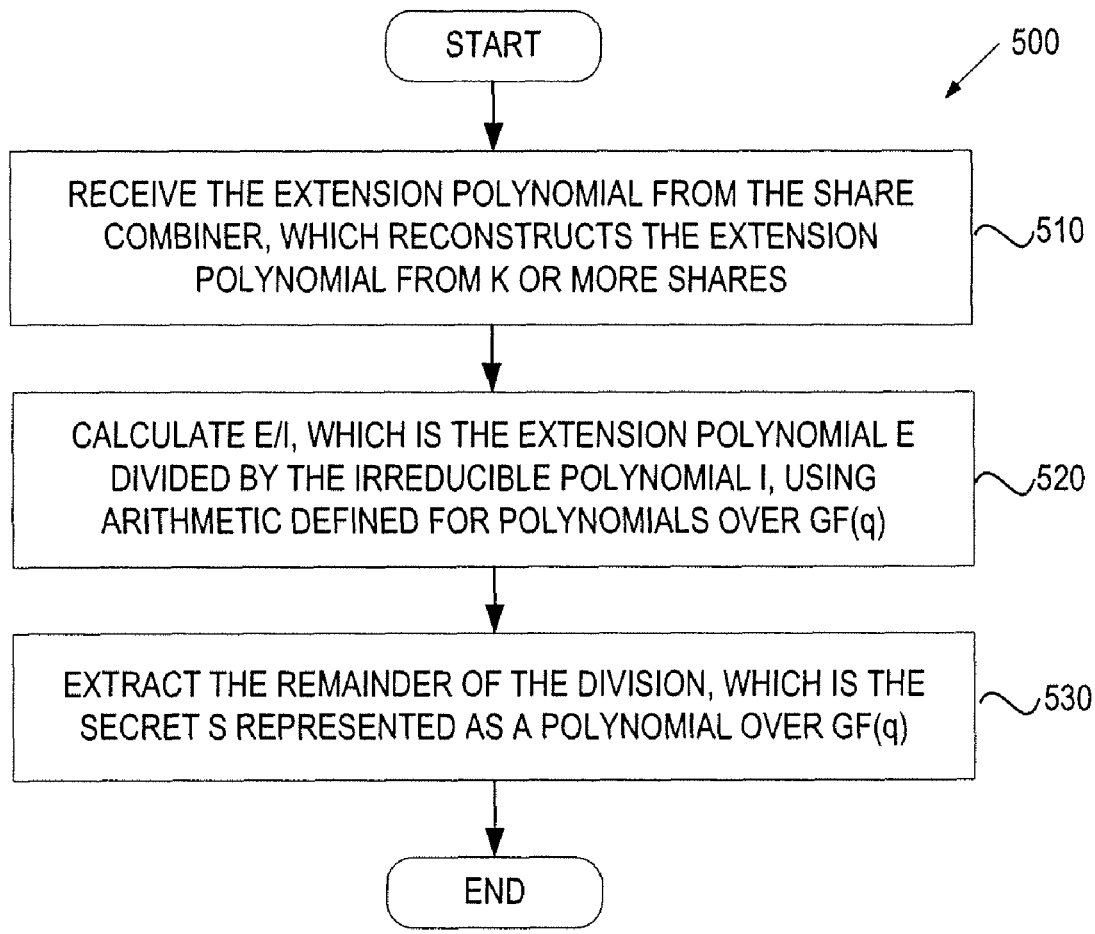
FIG. 5 illustrates a flow diagram of one embodiment of a method for extracting the secret from the extension polynomial.

FIG. 5 illustrates a flow diagram of one embodiment of a method 500 for extracting the secret from the extension polynomial E generated in FIG. 4. The method 500 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the method 500 is performed by the extractor 142 of FIG. 1.

Referring to FIG. 5, at block 510, the extractor 142 receives the extension polynomial E from the share combiner 141 of FIG. 1, which reconstructs the extension polynomial E from k or more shares. At block 520, the extractor 142 calculates E/I, which is the extension polynomial E divided by the irreducible polynomial I, using arithmetic defined for polynomials over GF(q). The extractor 142 may receive and store the irreducible polynomial I in memory prior to the secret reconstruction, or may receive the irreducible polynomial I at the time of the secret reconstruction. At block 530, the extractor 142 extracts the remainder of the division, which is equal to the secret polynomial over GF(q). In one embodiment, the original secret can be further converted from the coefficients of the secret polynomial to its original format, such as a binary bit string or a decimal number, by successive multiplications and additions.

Figure 6:
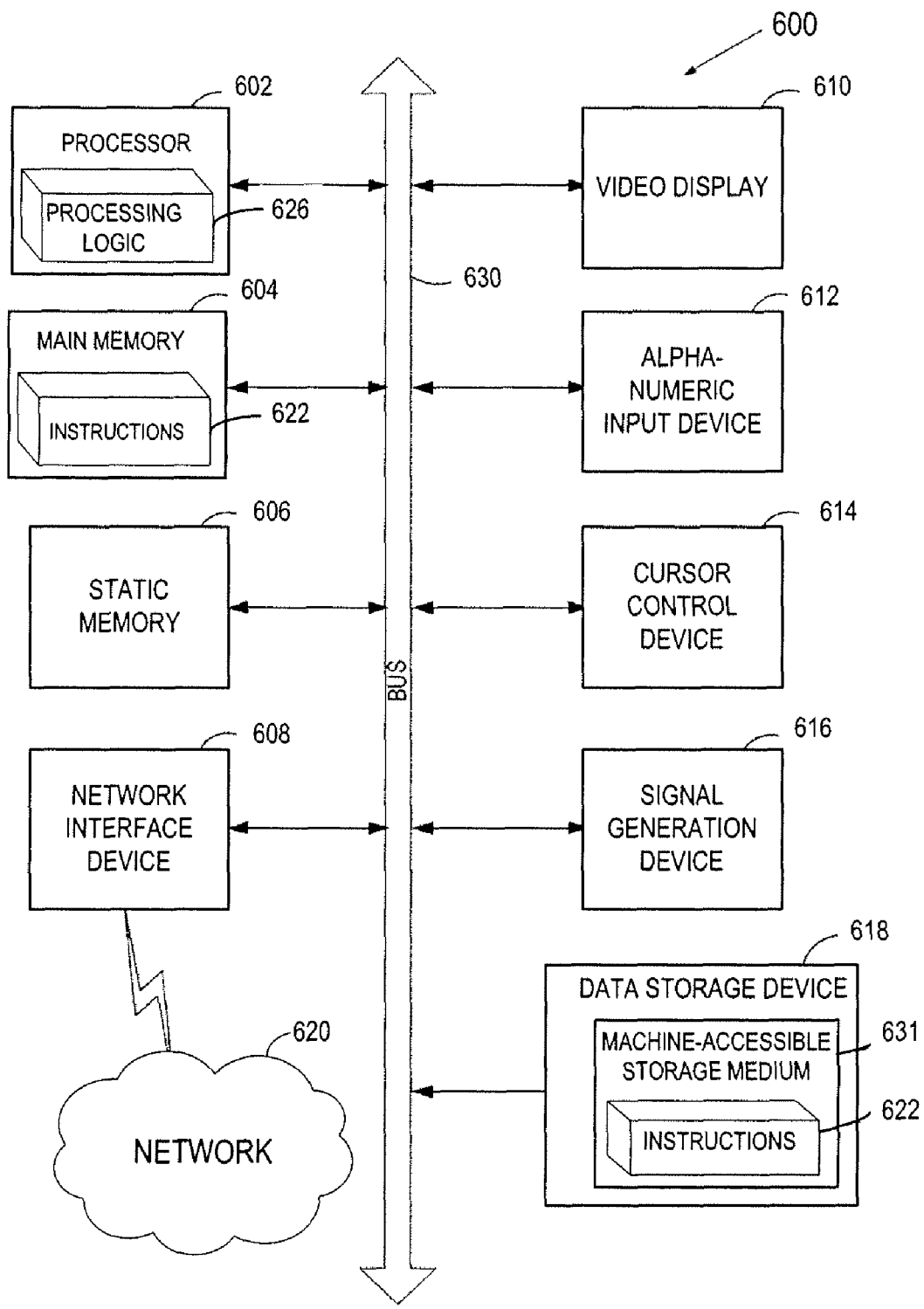
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store the secret 106 of FIG. 1. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret using polynomials over GF(q) have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
    representing a secret as a secret polynomial having a first degree, over GF(q), q being a prime or a power of a prime;
    embedding the secret polynomial into an extension polynomial having a second degree that is greater than the first degree; and
    dividing, by a processing device, the extension polynomial by a first number of coprime divisor polynomials over GF(q), using arithmetic defined for polynomials over GF(q), to generate a second number of shares of the secret for secret sharing among a plurality of cooperating entities, wherein the first number is equal to the second number and wherein each share comprises one of the divisor polynomials and a corresponding remainder.

2. The method of claim 1, wherein the second degree of the extension polynomial is less than a lowest-degree product of a third number of the divisor polynomials and is greater than a highest-degree product of one less than the third number of the divisor polynomials, the third number representing a minimum number of shares from which the secret can be reconstructed.

3. The method of claim 1, further comprising:
    determining the degree of the divisor polynomials in view of the size of the secret $2^s$, wherein s is the length of the secret represented as a binary bit string.

4. The method of claim 1, wherein the secret is to be reconstructed with any integer number of the shares in a range between the third number and the first number.

5. The method of claim 1, wherein representing the secret as a secret polynomial further comprises:
    converting the secret into a sequence of coefficients of the secret polynomial, each coefficient being associated with one of q printable characters used in a base-q coding scheme, wherein q is a prime number or a prime power less than 94.

6. The method of claim 1, wherein representing the secret as a secret polynomial further comprises:
    converting the secret into a sequence of coefficients of the secret polynomial, each coefficient being associated with a predetermined number of bits g used in a binary coding scheme, where q is a smallest prime number or a smallest prime power greater than $2^g$.

7. The method of claim 1, wherein representing the secret as a secret polynomial further comprises:
    converting the secret into a sequence of coefficients of the secret polynomial, by repeatedly dividing the secret by q or by grouping a set number of bits of the secret for conversion.

8. A system comprising:
    data storage to store a secret; and
    a processing device coupled to the data storage and configured to:
    represent the secret as a secret polynomial having a first degree over GF(q), q being a prime or a power of a prime;
    embed the secret polynomial into an extension polynomial having a second degree that is greater than the first degree; and
    divide the extension polynomial by a first number of coprime divisor polynomials over GF(q), using arithmetic defined for polynomials over GF(q), to generate a second number shares of the secret for secret sharing among a plurality of cooperating entities, wherein the first number is equal to the second number and wherein each share comprises one of the divisor polynomials and a corresponding remainder.

9. The system of claim 8, wherein the second degree of the extension polynomial is less than a lowest-degree product of a third number of the divisor polynomials and is greater than a highest-degree product of one less than the third number of the divisor polynomials, the third number representing a minimum number of shares from which the secret can be reconstructed.

10. The system of claim 8,
    wherein the processing device is further configured to determine the degree of the divisor polynomials in view of the size of the secret $2^s$, wherein s is the length of the secret represented as a binary bit string.

11. The system of claim 8, wherein the processing device operates with an array processor or embedded hardware.

12. The system of claim 8, wherein the processing device is to represent the secret as a sequence of coefficients of the secret polynomial, each coefficient associated with one of q printable characters used in a base-q coding scheme, wherein q is a prime number or a prime power less than 94.

13. The system of claim 8, wherein the processing device is to represent the secret as a sequence of coefficients of the secret polynomial, each coefficient associated with a predetermined number of bits g used in a binary coding scheme, where q is a smallest prime number or a smallest prime power greater than $2^g$.

14. A non-transitory computer readable storage medium including instructions that, when executed by a processing device, cause the processing device to perform a method comprising:
    representing a secret as a secret polynomial having a first degree over GF(q), q being a prime or a power of a prime;
    embedding the secret polynomial into an extension polynomial having a second degree that is greater than the first degree; and
    dividing, by the processing device, the extension polynomial by a first number of coprime divisor polynomials over GF(q), using arithmetic defined for polynomials over GF(q), to generate a second number of shares of the secret for secret sharing among a plurality of cooperating entities, wherein the first number is equal to the second number and wherein each share comprises one of the divisor polynomials and a corresponding remainder.

15. The non-transitory computer readable medium of claim 14, wherein the second degree of the extension polynomial is less than a lowest-degree product of a third number of the divisor polynomials and is greater than a highest-degree product of one less than the third number of the divisor polynomials, the third number representing a minimum number of shares from which the secret can be reconstructed.

16. The non-transitory computer readable medium of claim 14, wherein the method further comprises: determining the degree of the divisor polynomials in view of the size of the secret $2^S$, wherein s is the length of the secret represented as a binary bit string.

17. The non-transitory computer readable medium of claim 14, wherein the secret is to be reconstructed with any integer number of the shares in a range between the third number and the first number.

18. The non-transitory computer readable medium of claim 14, wherein the method further comprises:
    converting the secret into a sequence of coefficients of the secret polynomial, each coefficient being associated with one of q printable characters used in a base-q coding scheme, wherein q is a prime number or a prime power less than 94.

19. The non-transitory computer readable medium of claim 14, wherein the method further comprises:
    converting the secret into a sequence of coefficients of the secret polynomial, each coefficient being associated with a predetermined number of bits g used in a binary coding scheme, where q is a smallest prime number or a smallest prime power greater than $2^g$.

20. The non-transitory computer readable medium of claim 14, wherein the method further comprises:
    converting the secret into a sequence of coefficients of the secret polynomial, by repeated dividing the secret by q or by grouping a set number of bits of the secret for conversion.

* * * * *